(12) United States Patent
da Silva et al.

(10) Patent No.: US 11,998,995 B2
(45) Date of Patent: Jun. 4, 2024

(54) MODULAR BORING HEAD WITH FINE ADJUSTMENT CLICK MECHANISM

(71) Applicant: Kennametal Inc., Latrobe, PA (US)

(72) Inventors: Marcelo Euripedes da Silva, Piracicaba (BR); Ruy Frota de Souza Filho, Latrobe, PA (US); Michael Hacker, Madrid (ES); Horst Jaeger, Nuremberg (DE); Eduard Ach, Moosbach (DE); Norbert Baumer, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 112 days.

(21) Appl. No.: 17/696,975

(22) Filed: Mar. 17, 2022

(65) Prior Publication Data

US 2023/0294179 A1 Sep. 21, 2023

(51) Int. Cl.
*B23B 29/034* (2006.01)

(52) U.S. Cl.
CPC .. *B23B 29/03403* (2013.01); *B23B 29/03425* (2013.01)

(58) Field of Classification Search
CPC ........ B23B 29/03425; B23B 29/03403; B23B 29/034; B23B 29/03; B23B 2260/138; B23B 2260/004; B23B 2260/07
See application file for complete search history.

(56) References Cited

U.S. PATENT DOCUMENTS

| | | |
|---|---|---|
| 3,178,969 A | 4/1965 | Yogus et al. |
| 3,349,648 A | 10/1967 | Holloway |
| 3,434,376 A | 3/1969 | Benjamin et al. |
| 3,697,187 A | 10/1972 | Faber et al. |
| 3,911,542 A | 10/1975 | Friedline et al. |
| 3,937,587 A | 2/1976 | Lindern et al. |
| 4,396,319 A | 8/1983 | Miles |
| 4,398,854 A | 8/1983 | Pape et al. |
| 4,428,704 A | 1/1984 | Kalokhe |
| 4,486,130 A * | 12/1984 | Lipp ................. B23B 29/03457 408/153 |
| 4,998,851 A | 3/1991 | Hunt |
| 5,257,881 A | 11/1993 | Scheer |

(Continued)

FOREIGN PATENT DOCUMENTS

| | | |
|---|---|---|
| EP | 0478239 A1 | 4/1992 |
| GB | 984189 A | 2/1965 |
| TW | 201615308 A | 10/2016 |

*Primary Examiner* — Alan Snyder
(74) *Attorney, Agent, or Firm* — Larry R. Meenan

(57) ABSTRACT

A modular boring head includes a tubular main body having an internal thread with a first pitch and a pair of axially extending cantilevered members. A movable rod engages the tubular main body such that the movable rod is movable with respect to the tubular main body in an axial direction, D. The movable rod has an internal thread with a second pitch different than the first pitch. A leadscrew is disposed within the tubular main body and has a plurality of gear teeth. Rotation of the leadscrew causes the pair of axially extending cantilevered members of the tubular main body to cooperatively engage with the plurality of gear teeth of the leadscrew in such a manner so as to produce an audible and tactile click, each click being indicative of a distance the movable rod is displaced with respect to the tubular main body.

20 Claims, 9 Drawing Sheets

(56) References Cited

U.S. PATENT DOCUMENTS

| | | |
|---|---|---|
| 2007/0084320 A1 | 4/2007 | Frank et al. |
| 2011/0262236 A1 | 10/2011 | Bignotto et al. |
| 2017/0259346 A1 | 9/2017 | Schmitt et al. |

\* cited by examiner

MODULAR BORING HEAD WITH FINE ADJUSTMENT CLICK MECHANISM

FIELD OF THE DISCLOSURE

In general, the disclosure relates to cutting tools for performing machining operations on a workpiece. In particular, the disclosure relates to a modular boring head that provides a reliable adjustment of the cutting diameter by using a fine adjustment click mechanism.

BACKGROUND OF THE DISCLOSURE

As is generally known, boring is a mechanical process for machining surfaces of revolution carried out by one or more cutting tools. Boring machines used for performing such operations typically allow the fitting of various types of tools to permit the performance of other operations, such as drilling, milling, thread-cutting, and the like.

Depending on the position of the shaft/arbor, such boring machines may be horizontal or vertical, and boring may be cylindrical, conical, radial or spherical, enabling internal conical or cylindrical surfaces to be obtained in spaces that are normally difficult to access. Such boring may utilize axes that are perfectly parallel to one another, by means of the positioning of the machining tool by means of adjustment of the headstock to a specific height and the platen in a transverse position, all the displacements being indicated on graduated scales by means of optical reading equipment or analog/digital counters.

Therefore, for such boring operations, use is made of boring tools selected as a function of the dimensions and characteristics of the operation (i.e., length and diameter). The tools commonly have small dimensions because they operate inside bores previously made by boring bits, such as the boring bar, which, in turn, has to be rigid, cylindrical and with no rectilinearity defect, affording correct positioning on the shaft/arbor for the mounting of bushes that form bearings, thereby preventing possible deflections and vibrations.

Such boring bars incorporate interchangeable tips and micrometric adjustment systems for increasing the machined diameter to compensate for tip wear, thus permitting better statistical control of the process. Such adjustment systems may include boring heads that allow precise boring within tolerance requirements.

However, conventional boring heads do not afford sufficient precision and allow coarse adjustment (i.e., the resolution of the apparatus allows increments of 0.010 mm in terms of the radius).

A further drawback lies in the fact that conventional boring heads require auxiliary equipment for making the adjustment of the measurement, thereby increasing the adjustment time.

Yet another drawback lies in the fact that conventional boring heads have a locking screw, enabling the apparatus to be unusable on account of damage caused to the adjustment mechanism during performance of the operation when carried out by an untrained technician. The locking screw also makes it difficult to makes adjustments because the cutting diameter changes when the operator locks the screw.

Thus, it would be desirable to provide a boring head for use in a modular boring bar that overcomes the problems mentioned above.

SUMMARY OF THE DISCLOSURE

The problem of providing an improved boring head with a fine adjustment click mechanism is solved by providing a tubular main body with a pair of axially extending cantilevered members that cooperatively engage gear teeth of a leadscrew to provide an audible and tactile click, each click being indicative of a distance the movable rod is displaced with respect to the tubular main body.

In one aspect, a modular boring head comprises a tubular main body having an internal thread with a first pitch and a pair of axially extending cantilevered members. The modular boring head further comprises a movable rod engaging the tubular main body such that the movable rod moves in an axial direction, D, with respect to the tubular main body. The movable rod has an internal thread with a second pitch different than the first pitch. The modular boring head further comprises a leadscrew disposed within the tubular main body and having a first external thread, a second external thread and gear teeth. The first external thread cooperatively engages the internal thread of the tubular main body, and the second external thread cooperatively engages the internal thread of the movable rod. Rotation of the leadscrew causes the pair of axially extending cantilevered members of the tubular main body to cooperatively engage with the plurality of gear teeth of the leadscrew in such a manner so as to produce an audible and tactile click, each click being indicative of a distance the movable rod is displaced with respect to the tubular main body.

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION OF THE DISCLOSURE

Figure 2:
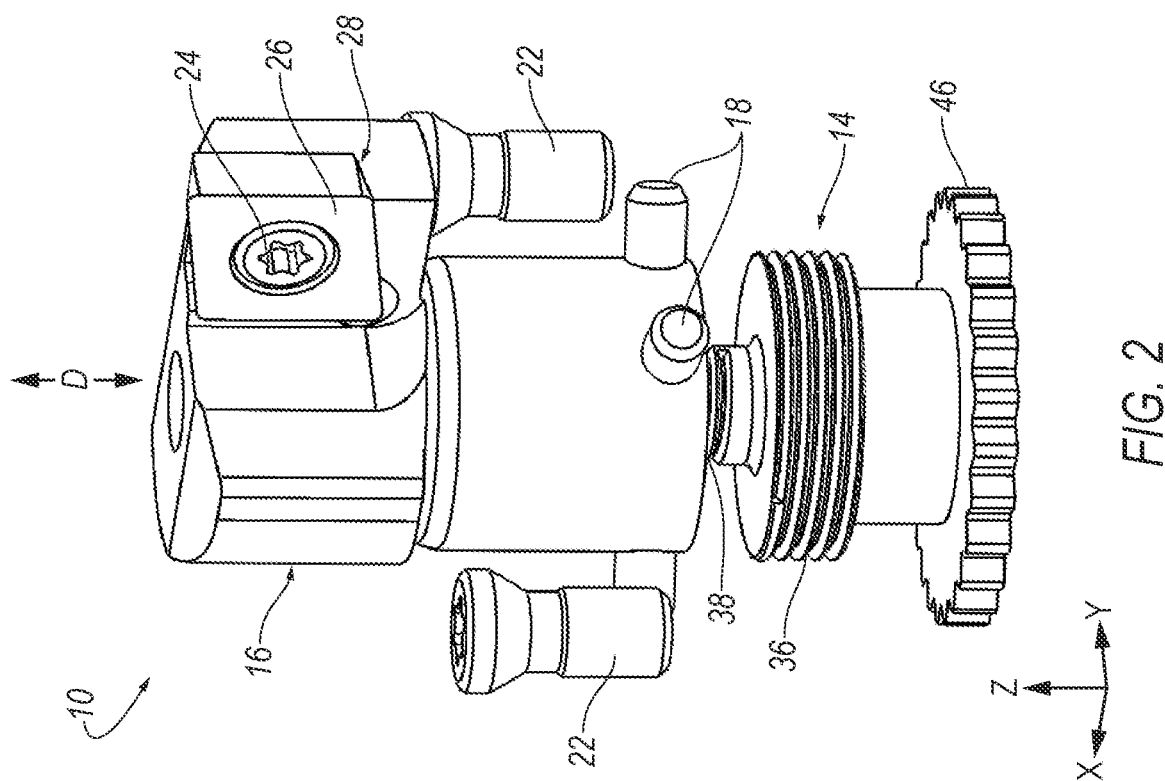
FIG. 2 is an isometric view of the modular boring head of FIG. 1 with the main tubular body omitted for clarity.
Figure 1:
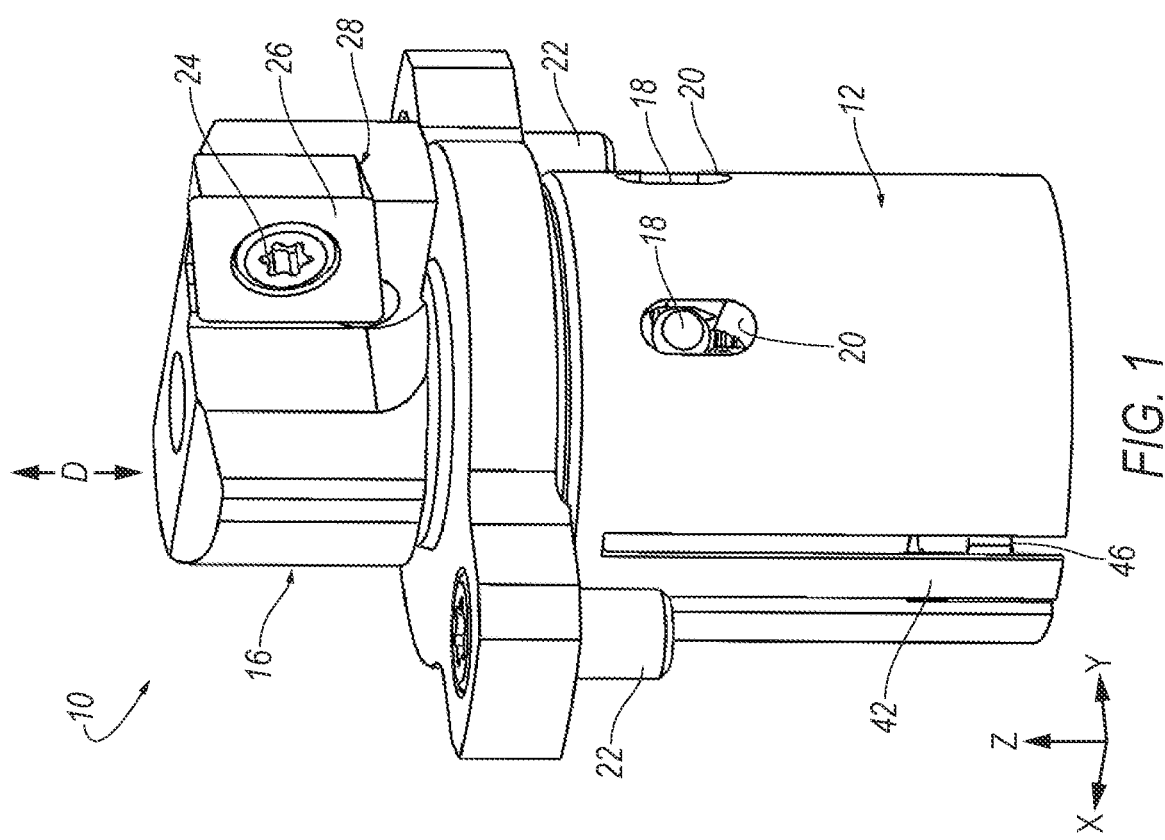
FIG. 1 is an isometric view of a modular boring head according to an embodiment of the disclosure.

As used herein, directional phrases, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, a "leadscrew" (or lead screw), also known as a power screw or translation screw, is a screw used to translate turning motion into linear motion.

As used herein, a "gear" is a rotating circular machine part having cut teeth or, in the case of a cogwheel or gearwheel, inserted teeth (called cogs), which mesh with another compatible toothed part.

Referring now to FIGS. 1-5, a modular boring head 10 is shown according to an embodiment of the disclosure. In general, the modular boring head 10 comprises a tubular main body 12, which is usually made of steel, and a leadscrew 14 disposed within the tubular main body 12, also usually made of steel. In FIG. 2, the tubular main body 12 is omitted to allow a better visualization of the leadscrew 14. The boring head 10 also includes a movable rod 16, usually made of steel, which moves in an axial direction (i.e., parallel to the z-axis) relative to the tubular main body 12. Cylindrical pins 18 are assembled with an interference fit in the movable rod 16. The pins 18 are also guided in axially elongated slots 20 in the tubular main body 12 to act as an anti-rotation feature and prevent the rotation of the movable rod 16 but allow movement of the movable rod 16 by a distance in the axial direction, D, indicated by the arrows shown in FIGS. 1-3 and 5. Threaded fasteners 22, such as a bolt, and the like, are used to attach the steel body 12 to a tool holder (not shown). A mounting screw 24 is used to clamp a cutting insert 26 in a pocket 28 of the movable rod 16.

Figure 5:
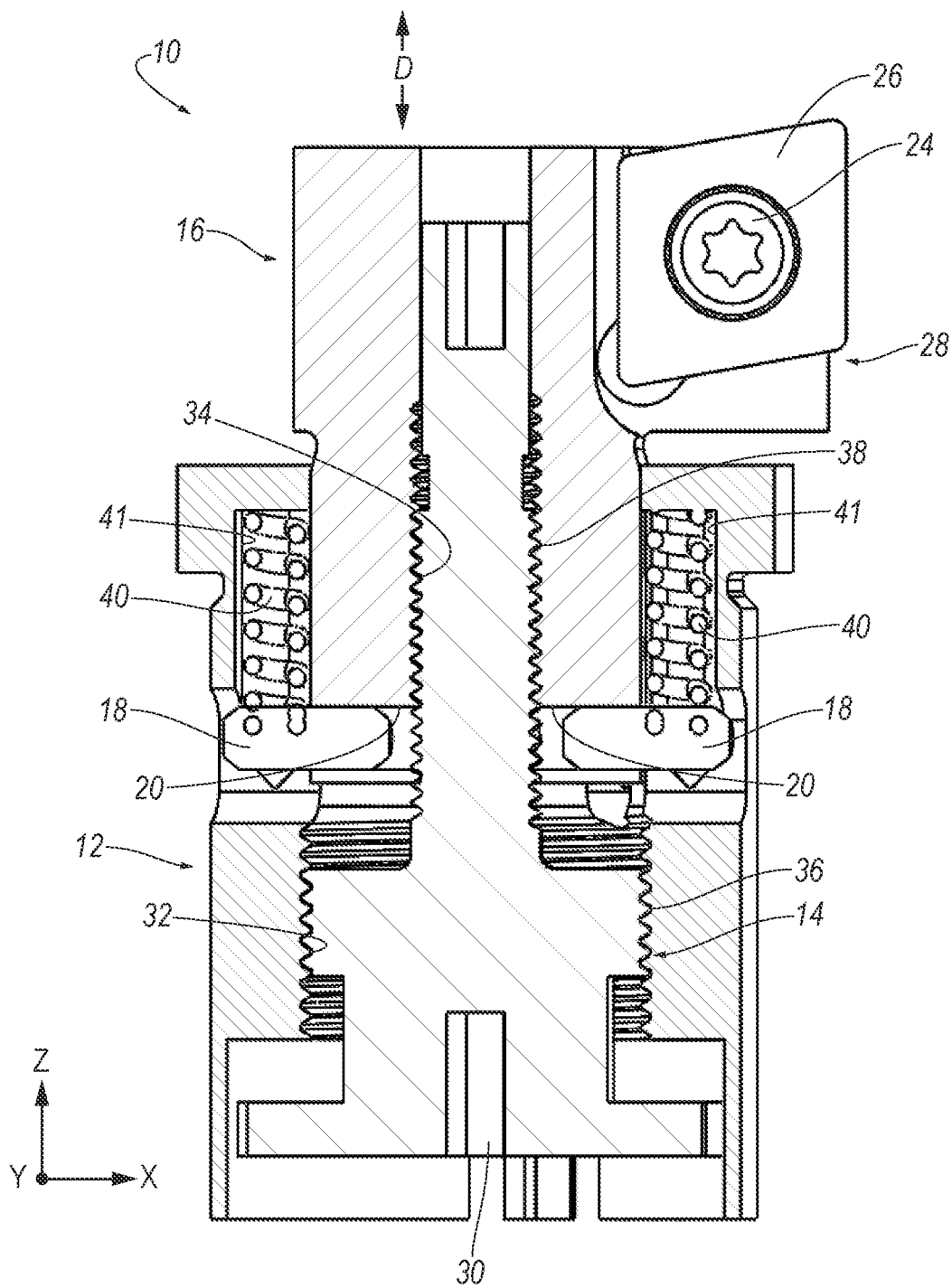
FIG. 5 is a cross-sectional view of the modular boring head taken along line 5-5 of FIG. 4.
Figure 7:
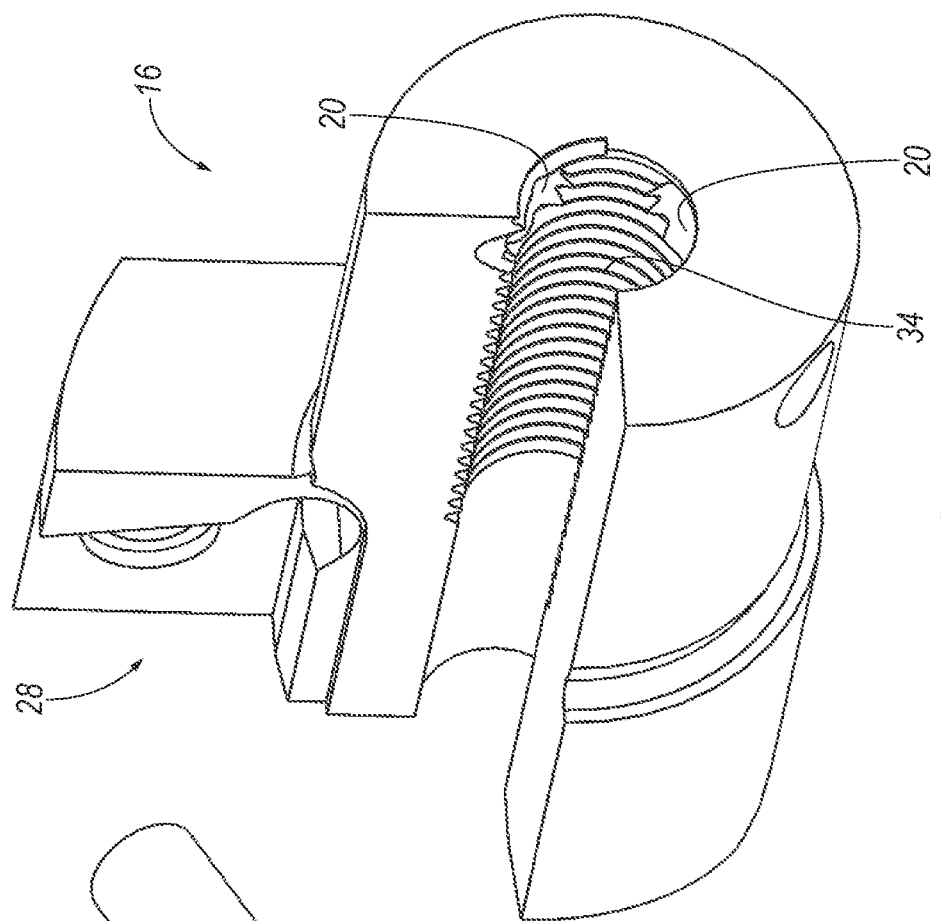
FIG. 7 is a cross-sectional view of the movable rod according to an embodiment of the disclosure.
Figure 6:
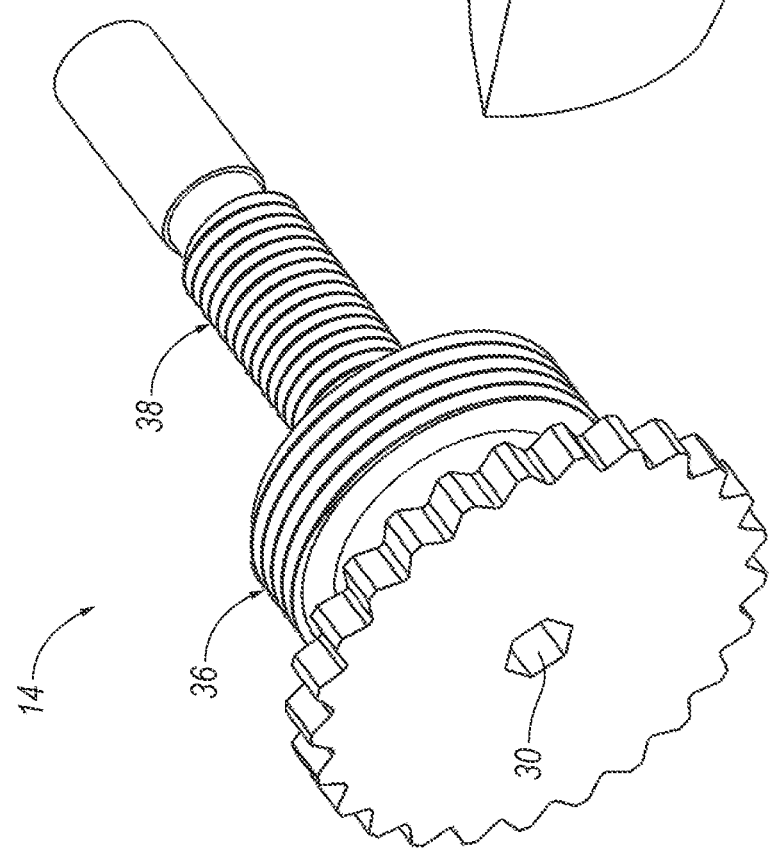
FIG. 6 is a bottom isometric view of the leadscrew according to an embodiment of the disclosure.
Figure 8:
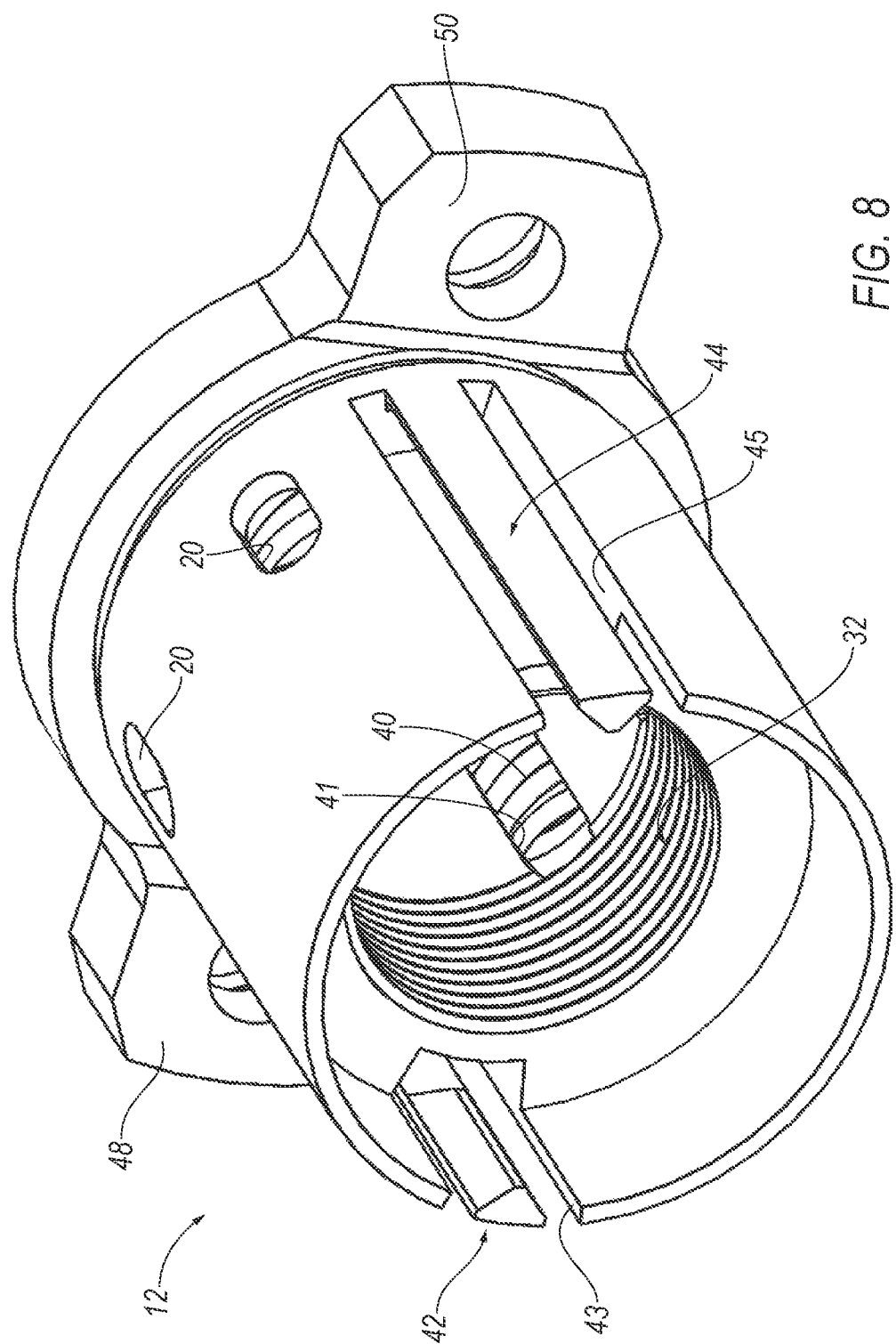
FIG. 8 is a bottom isometric view of the tubular main body according to an embodiment of the disclosure.

Axial adjustment of the movable rod 16 and cutting insert 26 by a distance in the axial direction (i.e., parallel to the z-axis) is accomplished by rotating the leadscrew 14 with the use of a tool, such as an Allen wrench, that engages a hexagon recess 30, located at one end of the leadscrew 14. As shown in FIGS. 7 and 8, the tubular main body 12 and the movable rod 16 have internal threads 32, 34, respectively, with different pitches. As shown in FIGS. 5-7, the leadscrew 14 has external threads 36, 38 that cooperatively engage the internal thread 32 of the tubular main body 12 and the internal thread 34 of the movable rod 16, respectively, as shown in FIGS. 5 and 6. In the illustrated embodiment, the external threads 36 of the leadscrew 14 that cooperatively engage with the internal threads 32 of the tubular main body 12 have a larger diameter than the external threads 38 of the leadscrew 14 that cooperatively engage with the internal threads 34 of the movable rod 16.

One or more pins 18 prevent rotation of the movable rod 16, while allowing the movable rod 16 to move in an axial direction, D, (i.e., parallel to the z-axis) by a distance equal to the difference of pitches of the threads 36 and 38. For example, if the leadscrew 14 is rotated one complete turn (360°), and if the pitch difference is about 0.05 mm, the movable rod 16 will move in the axial direction by about 0.05 mm.

Figure 10:
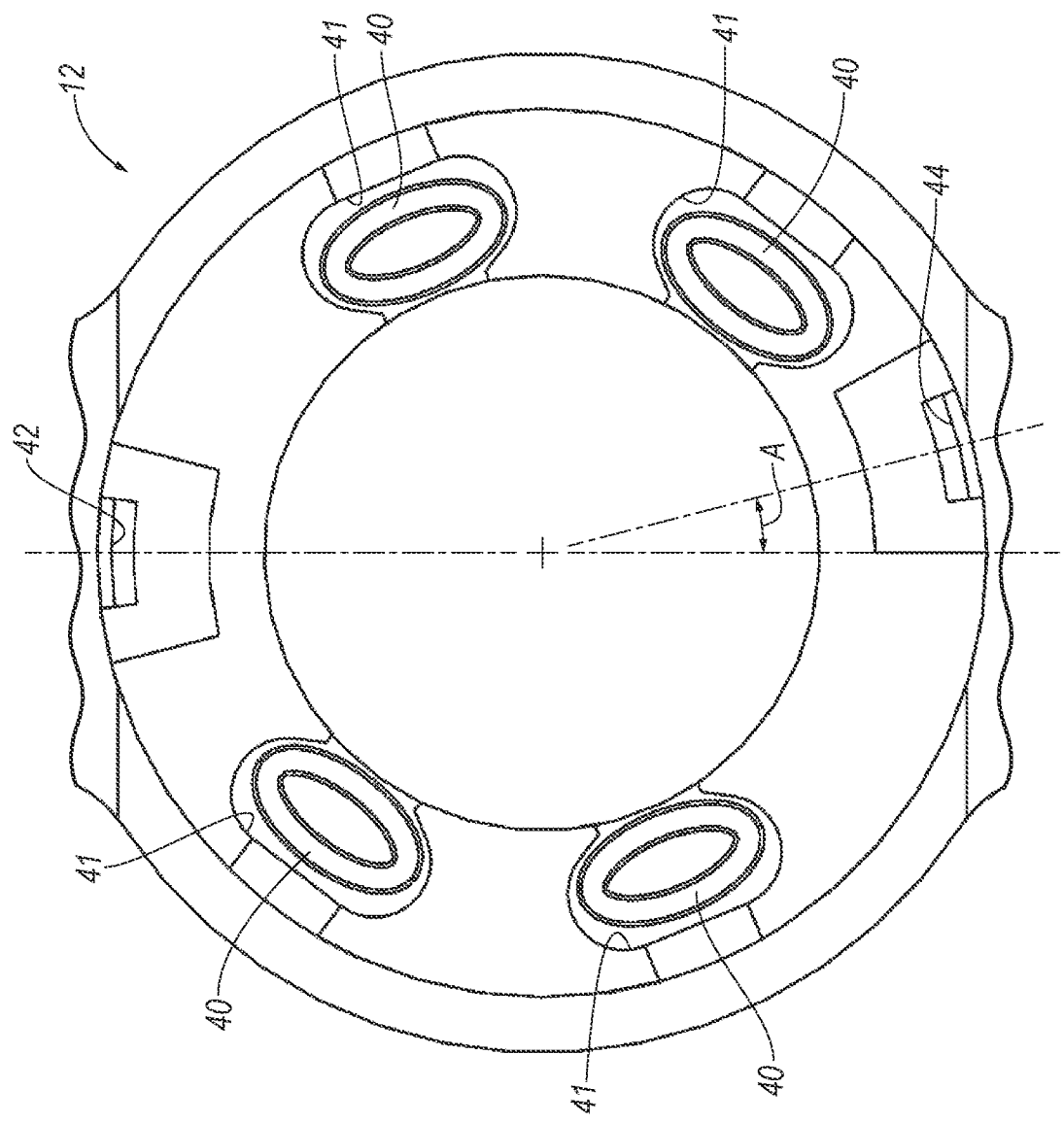
FIG. 10 is an enlarged plan view of a spring geometric shape according to an aspect of the disclosure.
Figure 9:
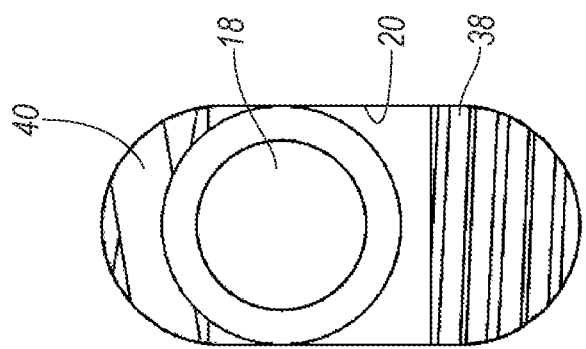
FIG. 9 is an enlarged view of the anti-rotation mechanism for the movable rod comprising a slot and a cylindrical pin of the modular boring head of FIG. 1.
Figure 11:
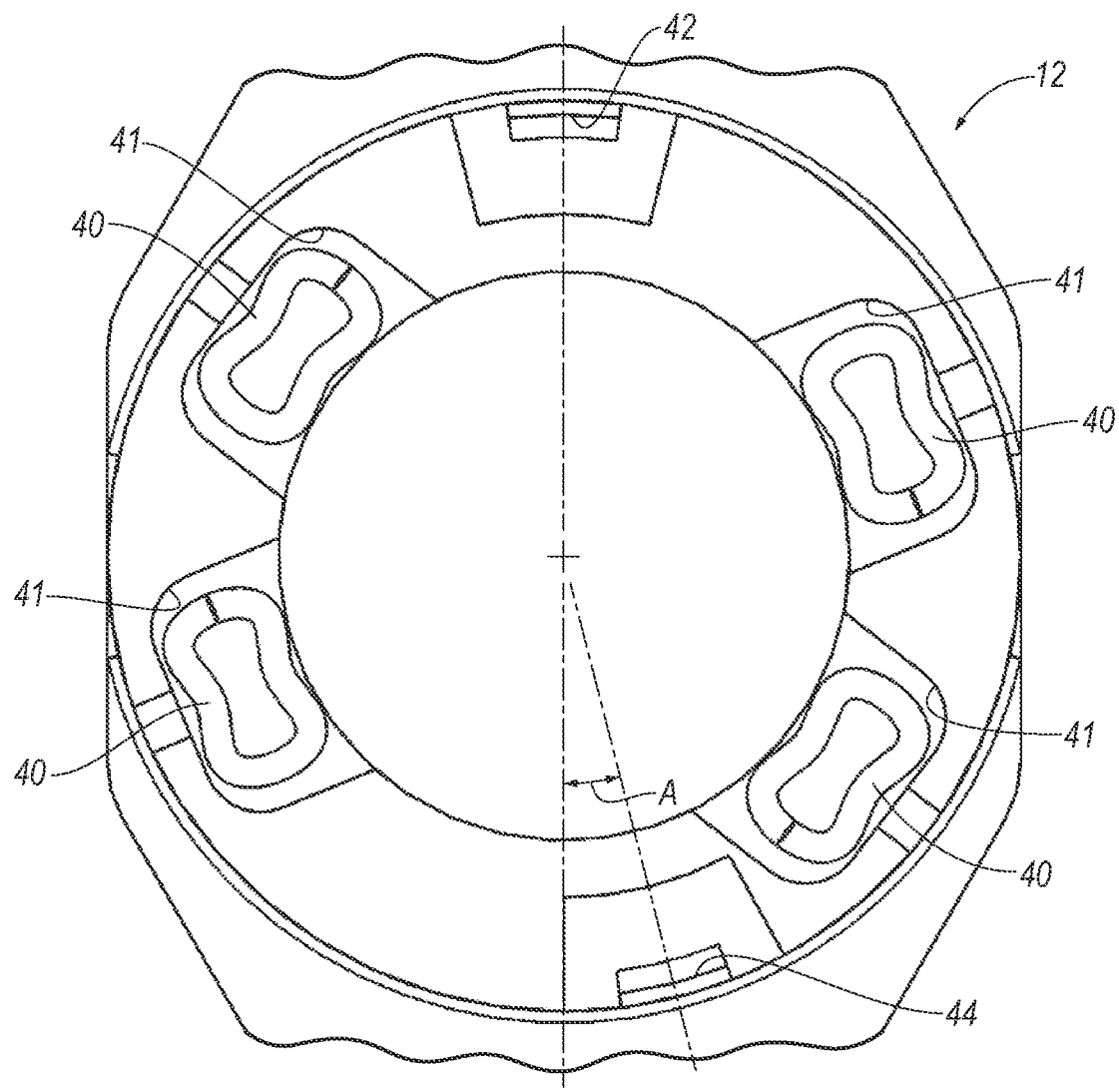
FIG. 11 is an enlarged plan view of another spring geometric shape according to another aspect of the disclosure.

As shown in FIG. 9, the pins 18 are also in contact with springs 40, which can be 3-D printed with the tubular main body 12. Each spring 40 is contained within a housing 41 in the tubular main body 12. The springs 40 provide a biasing force in the axial direction and are important to eliminate the clearance between the internal thread 32 of the tubular main body 12 and the internal thread 34 of the movable rod 16 and the first and second external threads 36, 38 of the leadscrew 14, thereby assuring precision axial adjustment of the boring head 10. To increase the stiffness of the springs 40, the springs 40 can be formed with various non-circular geometric shapes, such as elliptical, oblong, and the like, as shown in FIGS. 10 and 11.

Figure 12:
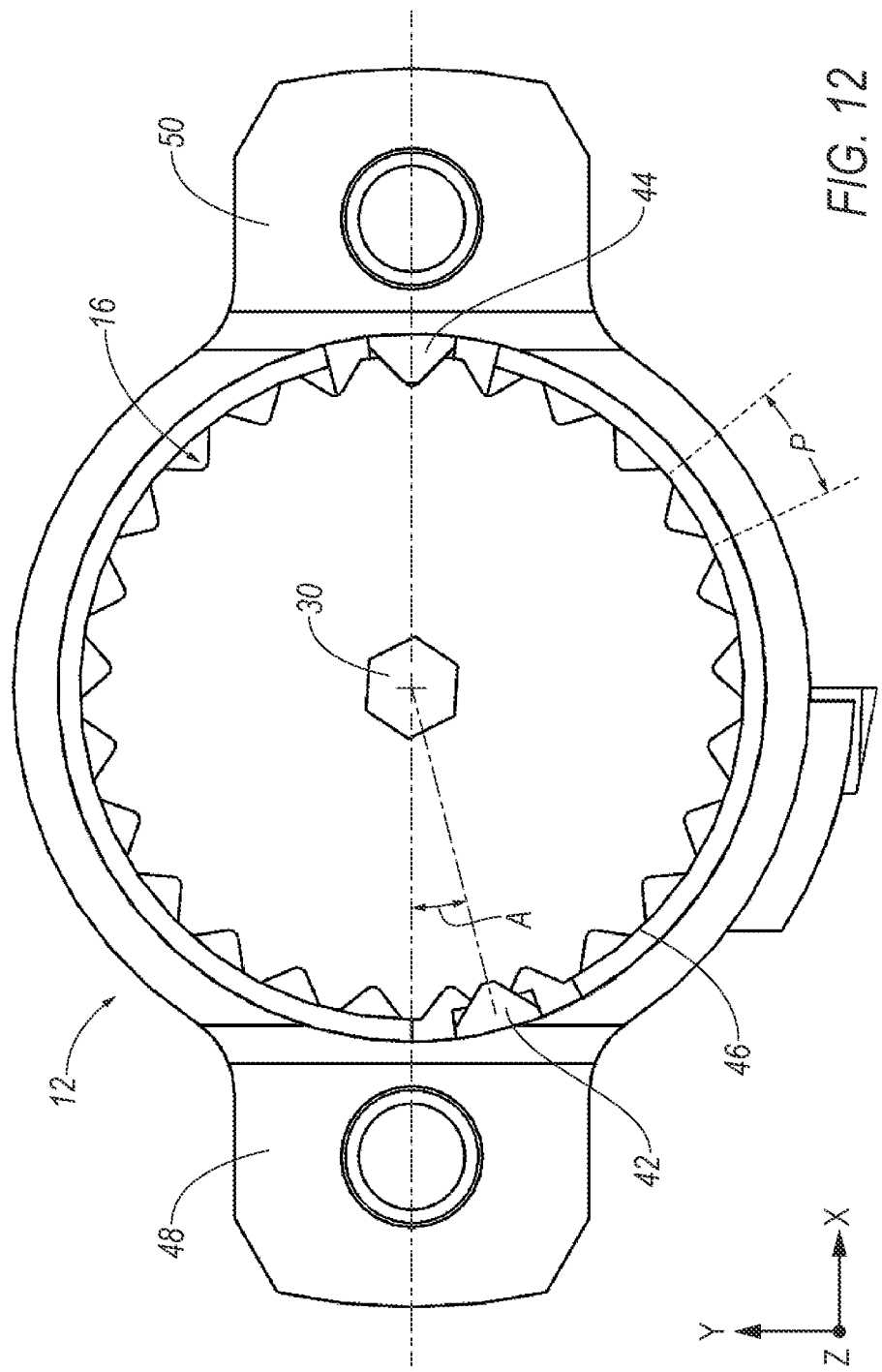
FIG. 12 is a bottom view of the modular boring head of FIG. 1 showing the interaction between the cantilevered members and the leadscrew according to an aspect of the disclosure.

The modular boring head 10 has a click mechanism that provides an audible and tactile feedback to the operator during the fine adjustment of the modular boring head 10. Specifically, the tubular main body 12 has a pair of axially extending cantilevered members 42, 44 disposed within a respective axially extending slot 43, 45, which cooperatively engage the gear teeth 46 of the leadscrew 14, as shown in FIG. 12. It should be noted that the cantilevered members 42, 44 are not exactly diametrically opposite (i.e., 180°) each other, but are offset from each other by an angle, A, of about 7.2°. In the illustrated embodiment, for example, the leadscrew 14 has a total of twenty-five gear teeth 46. Thus, the gear teeth 46 are spaced apart at a pitch, P, of about 14.4° from each other (360°/25=14.4°). Because the cantilevered members 42, 44 are offset from each other by the angle, A, of about 7.2°, one cantilevered member 44 is meshed with one of the gear teeth 46, while the other cantilevered member 42 is not meshed with one of the gear teeth 46. As a result, the precision of the rotation is 360°/(2×25)=7.2°, which is not possible by using conventional trial and error methods.

The engagement of the cantilevered members 42, 44 with the teeth 46 provides a defined stop to rotate the leadscrew 14. Therefore, the operator can control the rotation of the leadscrew 14 by feeling the engagement and disengagement of the teeth 46 with the cantilevered members 42, 44. Furthermore, as previously explained, one complete turn of the leadscrew 14 corresponds to 0.05 mm. The rotation of the leadscrew 14 by about 7.2° will result in a displacement by a distance in the axial direction, D, of about 0.001 mm. It will be appreciated that the invention is not limited by the number of gear teeth 46, and the invention can be practiced with any desirable number of gear teeth 46, depending on the quality of the audible and tactile feedback provided by the click mechanism.

Figure 3:
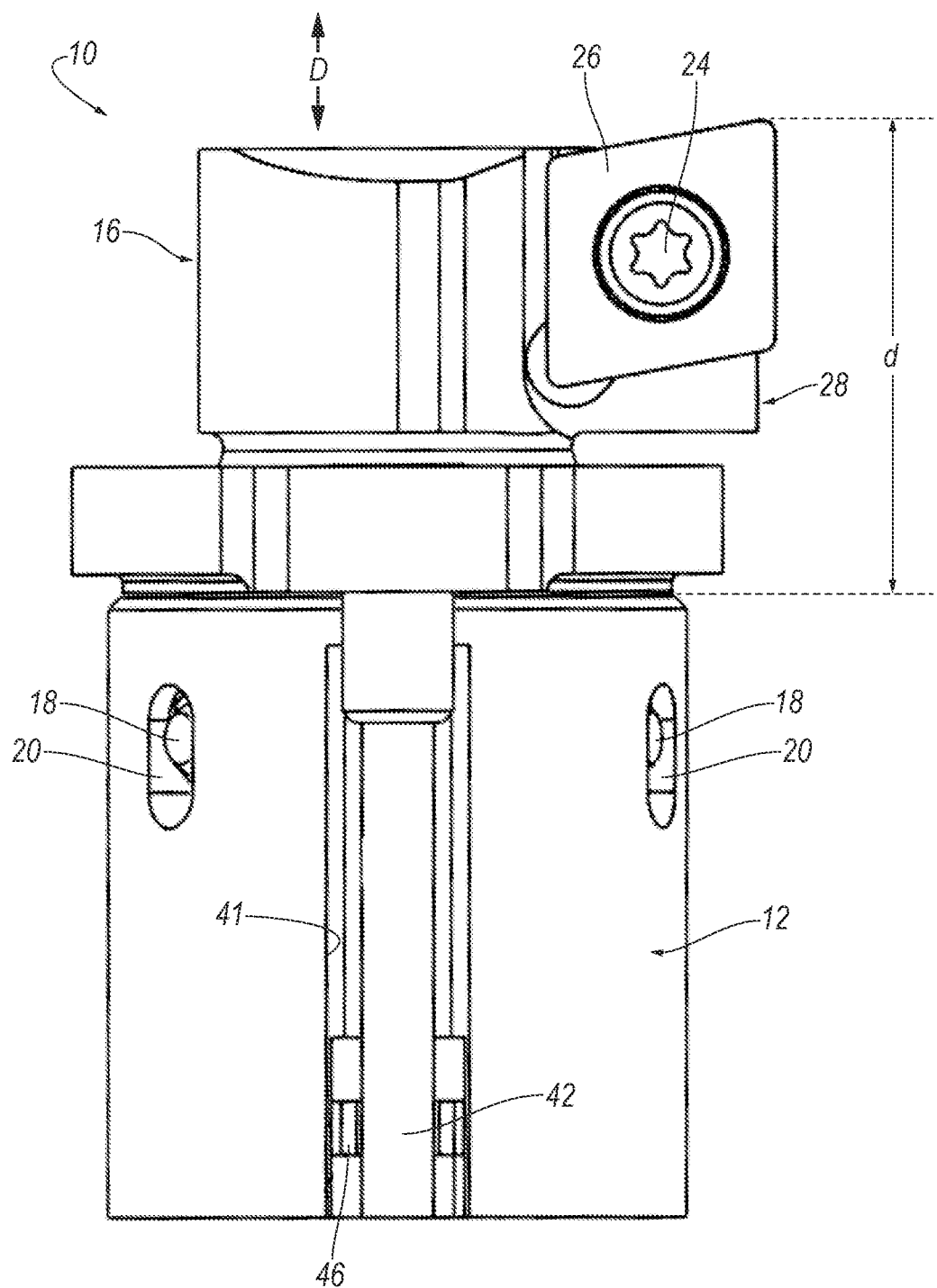
FIG. 3 is a side view of the modular boring head of FIG. 1.
Figure 4:
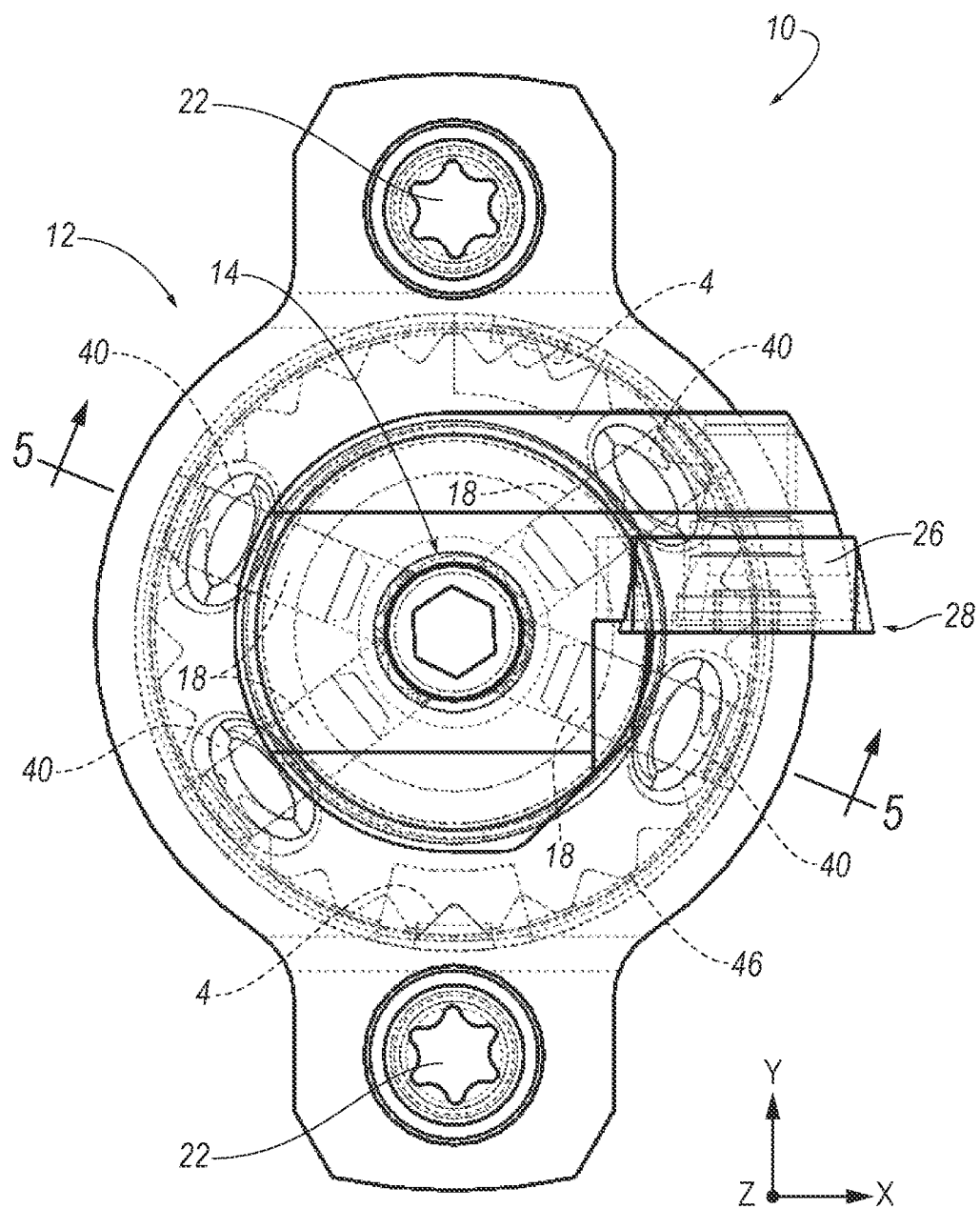
FIG. 4 is a top view of the modular boring head of FIG. 1.

It should be noted that the body 12 has two contact surfaces 48, 50, which can be ground to keep constant the distance, d, between these contact surfaces 48, 50 and the top of the cutting insert 26, as shown in FIG. 3. This is particularly useful to compensate for the manufacturing tolerances of the insert pocket 28 during the manufacturing process of the modular boring head 10.

Finite Element Analysis (FEA) of the effects of stress on the cantilevered members 42, 44 was performed. The results indicate that the stresses on the cantilevered members 42, 44 were very low, thereby indicating that the cantilevered members 42, 44 perform well.

The modular boring head 10 of the disclosure has several technical advantages when compared to conventional boring heads. One technical advantage is that the modular boring head 10 of the disclosure has relatively fewer components, which helps the cost reduction. Another technical advantage is that the modular boring head 10 of the disclosure provides a means to eliminate the thread clearance, even in a very small body, which is important to the precision of 1 µm. Yet another technical advantage is that the modular boring head 10 provides very good control of the tool adjustment, through a click mechanism that works even in a very small boring head. Lastly, the modular boring head 10 of the disclosure provides a means of having the full stroke even considering the small size of the tool and the manufacturing tolerances of the tool.

Having described presently preferred embodiments the disclosure may be otherwise embodied within the scope of the appended claims.

What is claimed is:

1. A modular boring head, comprising:
   a tubular main body having an internal thread with a first pitch and a pair of axially extending cantilevered members;
   a movable rod engaging the tubular main body such that the movable rod moves in an axial direction, D, with respect to the tubular main body, the movable rod having an internal thread with a second pitch different than the first pitch;
   a leadscrew disposed within the tubular main body and having a first external thread, a second external thread and a plurality of gear teeth, the first external thread cooperatively engaging the internal thread of the tubular main body, the second external thread cooperatively engaging the internal thread of the movable rod; and
   an anti-rotation feature for preventing rotation of the movable rod,
   wherein the anti-rotation feature comprises at least one cylindrical pin disposed within the movable rod by an interference fit and disposed within an elongated slot formed in the tubular main body,
   wherein the at least one cylindrical pin contacts a spring contained within a housing in the tubular main body that provides a biasing force in the axial direction to eliminate clearance between the internal thread of the tubular main body and the internal thread of the movable rod and the first and second external threads of the leadscrew,
   wherein rotation of the leadscrew causes the pair of axially extending cantilevered members of the tubular main body to cooperatively engage with the plurality of gear teeth of the leadscrew in such a manner so as to produce an audible and tactile click, each click being indicative of a distance the movable rod is displaced with respect to the tubular main body.

2. The modular boring head of claim 1, wherein the pair of axially extending cantilevered members are not diametrically opposite each other.

3. The modular boring head of claim 2, wherein the pair of axially extending cantilevered member are offset by an angle, A, of about 7.2°.

4. The modular boring head of claim 1, wherein the leadscrew has twenty-five gear teeth, and wherein the gear teeth are spaced apart at a pitch, P, of about 14.4° from each other.

5. The modular boring head of claim 1, wherein the spring is 3-D printed has a non-circular geometric shape.

6. The modular boring head of claim 1, wherein the spring is 3-D printed has one of an elliptical and oblong geometric shape.

7. The modular boring head of claim 1, wherein the distance the moveable rod is displaced is a function of the difference in pitch between the internal thread of the tubular main body and the internal thread of the movable rod.

8. The modular boring head of claim 1, wherein the first external thread of the leadscrew that cooperatively engages with the internal threads of the tubular main body has a larger diameter than the second external threads of the leadscrew that cooperatively engage with the internal threads of the movable rod.

9. The modular boring head of claim 1, wherein the second pitch is different than the first pitch by about 0.05 mm, thereby causing the movable rod to move a distance in the axial direction by about 0.05 mm when the leadscrew is rotated one full turn.

10. The modular boring head of claim 1, wherein rotation of the leadscrew by about 7.2° will result in a displacement by a distance in the axial direction, D, of about 0.001 mm.

11. A modular boring head, comprising:
a tubular main body having an internal thread with a first pitch and a pair of axially extending cantilevered members;
a movable rod engaging the tubular main body such that the movable rod moves in an axial direction, D, with respect to the tubular main body, the movable rod having an internal thread with a second pitch different than the first pitch;
a leadscrew disposed within the tubular main body and having a first external thread, a second external thread and a plurality of gear teeth, the first external thread cooperatively engaging the internal thread of the tubular main body, the second external thread cooperatively engaging the internal thread of the movable rod;
at least one cylindrical pin disposed within the movable rod and disposed within a slot formed in the tubular main body, the at least one cylindrical pin preventing rotation of the movable rod; and
a spring contacting the at least one cylindrical pin for providing a biasing force in the axial direction to eliminate clearance between the internal thread of the tubular main body and the internal thread of the movable rod and the first and second external threads of the leadscrew,
wherein rotation of the leadscrew causes the pair of axially extending cantilevered members of the tubular main body to cooperatively engage with the plurality of gear teeth of the leadscrew in such a manner so as to produce an audible and tactile click, each click being indicative of a distance the movable rod is displaced with respect to the tubular main body.

12. The modular boring head of claim 11, wherein the pair of axially extending cantilevered members are not diametrically opposite each other.

13. The modular boring head of claim 12, wherein the pair of axially extending cantilevered member are offset by an angle, A, of about 7.2°.

14. The modular boring head of claim 11, wherein the leadscrew has twenty-five gear teeth, and wherein the gear teeth are spaced apart at a pitch, P, of about 14.4° from each other.

15. The modular boring head of claim 11, wherein the spring is 3-D printed has a non-circular geometric shape.

16. The modular boring head of claim 11, wherein the spring is 3-D printed has one of an elliptical and oblong geometric shape.

17. The modular boring head of claim 11, wherein the distance the moveable rod is displaced is a function of the difference in pitch between the internal thread of the tubular main body and the internal thread of the movable rod.

18. The modular boring head of claim 11, wherein the first external thread of the leadscrew that cooperatively engages with the internal threads of the tubular main body has a larger diameter than the second external threads of the leadscrew that cooperatively engage with the internal threads of the movable rod.

19. The modular boring head of claim 11, wherein the second pitch is different than the first pitch by about 0.05 mm, thereby causing the movable rod to move a distance in the axial direction by about 0.05 mm when the leadscrew is rotated one full turn.

20. The modular boring head of claim 11, wherein rotation of the leadscrew by about 7.2° will result in a displacement by a distance in the axial direction, D, of about 0.001 mm.

* * * * *